US008032299B2

(12) United States Patent
Fernández Hernández et al.

(10) Patent No.: US 8,032,299 B2
(45) Date of Patent: Oct. 4, 2011

(54) METHOD FOR MAP MATCHING WITH GUARANTEED INTEGRITY

(75) Inventors: Ignacio Fernández Hernández, Madrid (ES); José Caro Ramón, Tres Cantos (ES); Manuel Toledo López, Tres Cantos (ES); Miguel Angel Martínez Olagüe, Tres Cantos (ES); Miguel Azaola Sáenz, Tres Cantos (ES)

(73) Assignee: GMV Aerospace and Defence S.A. (ES)

( * ) Notice: Subject to any disclaimer, the term of this patent is extended or adjusted under 35 U.S.C. 154(b) by 407 days.

(21) Appl. No.: 12/401,975

(22) Filed: Mar. 11, 2009

(65) Prior Publication Data

US 2009/0234580 A1    Sep. 17, 2009

(30) Foreign Application Priority Data

Mar. 11, 2008  (EP) ..................... 08380079

(51) Int. Cl.
 *G01C 21/26* (2006.01)
(52) U.S. Cl. .................. 701/208; 701/210; 701/214
(58) Field of Classification Search .............. 701/118, 701/200, 208, 213; 340/988
See application file for complete search history.

(56) References Cited

U.S. PATENT DOCUMENTS

| | | | | |
|---|---|---|---|---|
| 5,323,152 | A * | 6/1994 | Morita | 340/988 |
| 5,774,824 | A * | 6/1998 | Streit et al. | 701/207 |
| 6,317,683 | B1 * | 11/2001 | Ciprian et al. | 701/118 |
| 6,581,005 | B2 * | 6/2003 | Watanabe et al. | 701/210 |
| 2002/0161523 | A1 * | 10/2002 | Endo | 701/213 |
| 2010/0033370 | A1 * | 2/2010 | Lopez et al. | 342/357.03 |
| 2010/0121518 | A1 * | 5/2010 | Tiernan et al. | 701/26 |
| 2010/0324815 | A1 * | 12/2010 | Hiruta et al. | 701/208 |

FOREIGN PATENT DOCUMENTS

| | | |
|---|---|---|
| EP | 0 393 935 | 10/1990 |
| EP | 1492072 A | 12/2004 |
| EP | 1526357 A1 | 4/2005 |
| EP | 1729145 A1 | 12/2006 |

OTHER PUBLICATIONS

European Search Report issued Aug. 27, 2008.
Quddus, M.A., et al., "Integrity of map-matching algorithms," Transportation Research Part C vol. 14(4), ScienceDirect, pp. 283-302, (2006).
Fouque, C., et al., "Tightly-coupled GIS data in GNSS fix computations with integrity testing," Int. J. Intelligent Information and Database System, pp. 1-19 (May 2008).
Yu, M., et al., "Improving Integrity and Reliability of Map Matching Techniques," Journal of Global Positioning Systems, vol. 5(1-2), pp. 40-46, (2006).
Syed, S., et al., "Linking Vehicles and Maps to Support Location-Based Services," GPS World, (Nov. 2005).
Quddus, M.A., "High Integrity Map Matching Algorithms for Advanced Transport Telematics Applications," Center of Transport Studies, Department of Civil and Environmental Engineering, Imperial College London, United Kingdom, (Jan. 2006).
Bernstein, D., et al., "An Introduction to Map Matching for Personal Navigation Assistants," Princeton University, pp. 1-16, (Aug. 1996).

* cited by examiner

*Primary Examiner* — Gerald J. O'Connor
*Assistant Examiner* — Jonathan K Ng
(74) *Attorney, Agent, or Firm* — Ostrolenk Faber LLP (57) ABSTRACT

The present invention belongs to the field of positioning applications, particularly those requiring or benefiting from the use of geographic information and needing a high service or integrity guarantee, such as positioning by means of a satellite navigation system for users and ground vehicles circulating through a network of streets and highways for example. The invention can be used both for critical safety applications and for those entailing legal or contractual responsibilities.

13 Claims, 5 Drawing Sheets

METHOD FOR MAP MATCHING WITH GUARANTEED INTEGRITY

CROSS REFERENCE TO RELATED APPLICATIONS

This application claims the priority benefit under 35 USC 119 of European patent application serial no. 08 380 079, filed 11 Mar. 2008, the complete disclosure of which is hereby incorporated by its reference.

FIELD OF THE INVENTION

The present invention belongs to the field of positioning applications, particularly those requiring or benefiting from the use of geographic information and needing a high service or integrity guarantee, such as positioning by means of a satellite navigation system for users and ground vehicles circulating through a network of streets and highways for example.

The invention can be used both for critical safety applications and for those entailing legal or contractual responsibilities.

BACKGROUND OF THE INVENTION

The use of Global Navigation Satellite Systems (GNSS), such as GPS, for positioning vehicles is currently very widespread. A user is able to determine his or her position and a temporal reference by means of receiving and processing the signal of several satellites. This information is determined by knowing the position of the satellites and the time that the signal has taken to reach the user. It is further necessary to estimate the delays affecting the arrival time of the signal, such as deviations of the satellites, atmospheric delay and local effects and effects of the receptor. A user can currently determine his or her position with a precision of approximately a few meters in environments with good visibility, greater errors existing in non-controlled environments.

In addition to the position and time solution, there are techniques assuring a confidence level, or integrity, for said solution. Said techniques provide a geometric place (ellipsoid in space, ellipse in the plane) where it is assured that the user is located with an associated probability (for example 99.99999% in the aeronautical environment). Said techniques are already known and applied in SBAS systems, such as WAAS or EGNOS, or are calculated by means of autonomous RAIM (Receiver Autonomous Integrity Monitoring) algorithms or derivatives, both for critical safety applications and for those applications having legal or contractual implications. There are techniques providing integrity in low visibility or non-controlled environments, such as urban areas, as described in EP1729145, "Method and System for providing GNSS navigation position solution with guaranteed integrity in non-controlled environments".

In addition the combined use of GNSS positioning and Geographic Information Systems (GIS) is very common, i.e. digital cartographic maps modeling the environment, such that the position information of the user can be related with the real world for the purpose of providing en route guidance or any other type of information.

The combination of satellite navigation and GIS is usually carried out by means of Map Matching (MM) techniques in applications for land transport. Said techniques identify which is the segment or road (street, highway, expressway) on which the user will most probably circulate, as well as his or her position therealong. In the event that there are no errors in the GNSS position nor in the GIS information, the process would be immediate, since the position would coincide with a point in the specific road on which the user is circulating. However, the reality is quite different since there are phenomena causing errors in the GNSS position—errors relating to satellites, atmospheric delays, multipath or signal reflection, particularly important in urban environments—, which can cause errors of up to hundreds of meters, as well as errors in the process of creating digital maps, mainly due to the scale factor, transforming coordinates, translating from a curved surface to a planar surface (generalization), position reference (datum) and the digitalization process.

The MM methods existing in the state of the art cover from the simplest algorithms, in which the position to the nearest segment or road at that instant is approximated, to other much more complicated algorithms. One of the main references in MM algorithms is "*An Introduction to Map Matching for Personal Navigation Assistants*", Bernstein D. Komhauser A., 1996, which describes the first approaches to using MM with a positioning system. The proposed methods are divided into geometric and topological methods. The former only take into account the geometry of the segments defining the GIS map, whereas the latter further take into account the way in which said segments are connected. More advanced methods have been subsequently developed in which the trajectory is compared over time with the possible trajectories on the map by means of pattern recognition, Kalman filters, or fuzzy logic for selecting the suitable road. However the precision of these methods is not assured, nor do they provide the user with a confidence value, or integrity, of the adopted solution, but rather they are focused on adjusting the position to a segment in the best possible manner in most cases.

The probabilistic MM method, described in "*Vehicle Location and Navigation System*" Zhao Y., 1997 and in "*High Integrity Map Matching Algorithms for Advanced Transport Telematics Applications*" Quddus M., 2006, could be considered background to the present invention, since it generates an ellipse from the covariance matrix of the position and analyzes only those segments which are located within said ellipse as possible segments, ruling out those the orientation of which does not coincide with that of the movement of the vehicle. The use of this ellipse based on the covariance of the position is similar to the previously described concept of integrity. The probabilistic method however has some drawbacks:

for example not being based on the integrity of the position which the navigation system provides, but rather it uses the covariance matrix only for selecting the possible roads within an area having great probability, which is not enough to guarantee the integrity of the position;

or for example proposing to use the direction of the movement for ruling out segments, risking ruling out the correct road in the case of turning, lane change, or error in calculating the direction of the movement, whereby upon using non-integral methods for selecting the road, the initial integrity, if there was any, would lose validity.

In the past few years methods which have attempted to provide an integrity value to the MM solution have been developed and are described below. Nevertheless the concept of integrity used does not correspond to the concept rigorously used in this patent, which is based on the concepts introduced by civil aviation. In fact, in no case does it assure the probability that the identified segment is the correct one, which is essential for the concept of integrity.

"*Integrity of map-matching algorithms*" Quddus M., Ochieng W., Noland B., 2006 and "*High Integrity Map Matching Algorithms for Advanced Transport Telematics*

*Applications"* Quddus M., 2006 propose an integral MM algorithm based on a global integrity indicator (0-100) for solutions given by already existing (topological, probabilistic and fuzzy logic) methods. Said indicator is determined by means of combining the following three criteria:

Integrity based on the uncertainty associated to the position solution: a standard deviation ($\sigma$) is determined based on the uncertainties of the map ($\sigma_{map}$) and of the GPS position ($\sigma_n$ and $\sigma_e$) and it is multiplied by a coefficient K, calculated by means of empirical results and depending on the number of lanes of the road. This indicator gives a measurement of the uncertainty of the GPS position and of the map, but in no case an integrity guarantee in and of itself.

Integrity based on the ability to correctly identify the road: The angle forming the segment selected by the MM algorithm and the trajectory of the vehicle is calculated from GPS or GPS+inertial sensors, and the smaller the angle the more integral the solution is considered to be. However, in addition to the fact that this indicator does not provide any integrity guarantee in and of itself, it will give a false alarm in the event that the vehicle is turning or changing lanes, and the direction does not coincide with that of the segment, or it will not detect a failure if the wrong road coinciding with the direction of the movement is selected for any reason.

Integrity based on the ability to precisely determine the position of the vehicle: An uncertainty indicator ($R_{3dms}$) based on the covariance of the GPS position plus the typical road width is subtracted from the distance between the GPS position and the position given by the MM algorithm. In the event that the result is positive, it is assumed that the probability of integrity is lower. This indicator does not provide a quantifiable integrity measurement, nor does it assure integrity in the event that the result is negative or close to zero.

Once the confidence index or integrity (0-100) is determined by means of the previous criteria using a fuzzy logic algorithm, a limit value (70) is determined under which an alarm is generated for the user. Said limit is based on empirical results for the purpose of optimizing the performance of the algorithm in the experiment conducted.

Based on the foregoing, it is concluded that the integrity provided by this algorithm cannot be considered reliable in all fields since it is not quantifiable nor is it based on theoretical fundamentals, therefore it can not be extrapolated to other situations beyond the experiments conducted. Therefore it does not provide the confidence necessary for critical safety applications or applications having legal or contractual implications. In addition, the performance level obtained (98.2% in the best of cases) does not seem to be sufficient for critical applications and is well under the confidence index of the method proposed herein.

Syed S. and Cannon E. in *"Linking vehicles and maps to support location-based services"* 2005; GPS World describe a novel method combining GIS, GPS and DR (Dead Reckoning) information for the purpose of improving the precision and reliability of positioning in urban environments. Nevertheless, said method does not provide any integrity indicator.

*"Improving integrity and reliability of map matching techniques"* Yu M. et al, 2006 also proposes different detection failure techniques in selecting a road (mismatch), combining GPS, INS and MM, and by means of curve recognition. Although it improves the reliability of the algorithm, 31.8% of failures still go undetected according to the results of the experiment conducted, and furthermore the method does not define or calculate a confidence value for the obtained solutions, but rather it is reduced to improving the reliability of the current MM techniques.

*"Tightly-coupled GIS data in GNSS fix computations with integrity testing"* Fouquet C., Bonnifait Ph., 2007, proposes an MM method with GPS using a tight coupling strategy in which a set of candidate segments is determined for each GPS solution based on certain criteria, and they are evaluated separately by means of a method similar to RAIM. In the event that there are several final candidates, the candidate minimizing the position residual of the least-squares solution is selected. Despite said reliability checking, this method does not assure the confidence of the selected solution. In addition, it does not take into account the information from previous instants.

European patent application published with number EP-1526357-A1 describes a method for detecting the position of a vehicle in a navigation system by means of map matching using the classic technique of the orthogonal projection of the position in the nearest segment. As with the aforementioned background documents, it does not assure integrity.

European patent application EP-1492072-A also describes a map matching method and system consisting of map layer processing optimization. It relates to improving the determination of the road in time real and does not assure integrity.

DESCRIPTION OF THE INVENTION

The invention relates to a method for determining a road or a set of passable roads or areas traveled by a user with a minimum associated probability or integrity according to claim 1, and the use of said method in a recurrent manner over time for the purpose of determining the trajectory followed by the user with integrity according to claim 2. Preferred embodiments of the method are described in the dependent claims.

According to a first aspect of the invention, a method for determining a road or a set of passable roads or areas traveled by a user with a minimum associated probability or integrity is provided, which comprises:

receiving from a positioning system information relating to a first and a second position solutions PVT of said user in a first instant of time $t_a$ and in a second instant $t_b$ after the first instant $t_a$, respectively, as well as respective position integrity ellipses, $I_a$ and $I_b$, each with a minimum associated probability $P_a$ and $P_b$ that the user is located in them in $t_a$ and in $t_b$, respectively, and a position increase $\Delta_{ab}$ between $t_a$ and $t_b$ with a position increase integrity ellipse $I_{ab}$ and its associated probability $P_{ab}$;

obtaining from a geographic information system GIS, information regarding respective passable areas TGIS corresponding to said first and second PVT solutions;

determining a first passable integral area $S_a$ and a second passable integral area $S_b$ as an intersection for each instant of time of said position integrity ellipses with said passable areas TGIS;

propagating said first passable integral area to the subsequent instant $t_b$ by means of the position increase $\Delta_{ab}$ between the first and second instants of time provided by the positioning system, taking into account the uncertainty associated to said increase determined by the position increase integrity ellipse $I_{ab}$, a propagated integral area $S_{ab}$ being obtained;

eliminating from said propagated integral area $S_{ab}$ the non-passable areas, a propagated passable integral area $S'_{ab}$ being obtained;

determining the final passable integral area $S'_b$ in the second instant $t_b$, either as the smallest of said second passable integral area $S_b$ and said propagated passable integral area $S'_{ab}$ or as the intersection of both areas $S'_{ab}$ and $S_b$;

determining the integrity level of $S'_b$, this is the minimum probability that the user is located in said final passable integral area $S'_b$ in the second instant $t_b$:

i. In the event that the final passable integral area $S'_b$ is determined as the smallest of $S_b$ and $S'_{ab}$, the integrity level will be the probability associated to the area which has been chosen:

if it is $S_b$, it will be the probability $P_b$ associated to the ellipse $I_b$;

if it is $S'_{ab}$, it will be the product of the probability $P_a$ associated to the ellipse $I_a$ and the probability $P_{ab}$ associated to the ellipse $I_{ab}$.

ii. In the event that the final passable integral area $S'_b$ is determined as the intersection of $S'_{ab}$ and $S_b$, the upper limit of the probability that the user is located outside of said intersection is the sum of the probabilities of being located outside of the areas $S'_{ab}$ and $S_b$, then the lower limit of the integrity level (or probability that the user is located within said intersection) is determined by $P_a P_{ab} + P_b - 1$.

In other words, the present invention relates to an Integral Map Matching method by means of the combined use of cartographic information (digital maps in which the user-passable areas are specified by means of the segments defining roads and their widths, or by any other means, with a given and known precision) with integral positioning information (position, position increase, time, absolute position integrity and the position increase integrity).

The invention mainly relates to GNSS positioning, although it is also valid for alternative positioning methods provided that these methods are integral, such as Inertial Navigation Systems (INS), radiofrequency (UMTS, Wifi, UWB, etc), or a GNSS system hybridized with an inertial Dead Reckoning system, or other systems by means of beacons and/or wireless communications or other methods, provided that said positioning system provides the information and the necessary integrity and the method follows the previously defined steps.

In the event that the positioning system used is a GNSS system, the position increase between two instants of time and its integrity are determined by means of the increase of the carrier phase measurement of the satellites between such instants and its associated uncertainty.

The invention also preferably relates to the recursivity of the proposed method; the method of the invention is thus repeated for each new PVT solution provided in each new instant $t_i$, based on the propagation of the passable integral area from a previous instant $t_j$, whether it is the immediately previous instant $t_{i-1}$ or another one, determining the passable areas and their associated probability in several consecutive instants along a trajectory.

Additional processing or post-processing is also preferably carried out with a configurable periodicity and along a configurable arc of instants m, in which for each instant $t_i$ of said arc:

the passable area of instant $t_i$ is propagated to the immediately previous instant $t_{i-1}$ by means of the position increase between both instants, taken in the opposite direction, and its associated integrity ellipse, eliminating the non-passable areas, and it is compared with the passable area previously calculated in $t_{i-1}$, selecting the smallest of the two, or carrying out the intersection thereof, such as has been previously described;

the previous steps are carried out on all instants of the arc—from $t_{i-1}$ to $t_{i-2}$, from $t_{i-2}$ to $t_{i-3}$, etc., up to $t_{i-m}$—, as has been previously defined by the recursivity of the method, for the purpose of later including the information of passable areas in $t_i$ in the previous instants.

The objective of the invention is to assure with a required integrity level not only the position of the user but also in which road and section of road he or she is located in a given instant, as well as improving said solution and preferably determining his or her trajectory and the set of roads traveled by means of reverse processing over time.

The invention is based on the following principles:

1) The initial definition of the passable areas from a GIS database, in which the following are determined: the segments forming the roads on which it is possible to circulate, and their width, or the polygons separating the passable areas from those which are not passable. The definition of passable areas preferably takes into account the uncertainty or maximum error of the cartographic information defined by the map provider and said information being considered as input to the process. In order to assure the integral use of the cartographic information the passable area can be increased as much as necessary in order to prevent areas from being ruled out due to imprecision of the map.

2) Determining the user-passable integral area in each instant from the given position, for example by a GNSS system, and its integrity ellipse (defined for example by means of Protection Levels, for example as defined in patent EP1729145) and the passable areas therein.

3) Determining the position increase of the user between two instants of time and its integrity. In the case of GNSS positioning, the increase in the carrier phase measurement of the satellites between both instants is used as input to estimate the position increase between two instants. The uncertainty of the estimation is represented by means of a position increase integrity ellipse, obtained in a manner similar to the absolute position integrity, but without being associated to a fixed point, but rather associated to a vector. Given the characteristics of the error of the phase increase measurement, the relative position increase can be much more precisely determined than the absolute position, with an uncertainty generally in the order of centimeters, even in urban environments.

4) Translating the passable area of the previous instant to the subsequent instant, based on said position increase and its associated uncertainty, expanding the translated area as needed to maintain integrity according to the position increase integrity ellipse.

5) Determining the new passable area as (a) the smallest of the propagated passable area from a previous instant and the passable area in the current instant or (b) the intersection between the propagated passable area from a previous instant and the passable area in the current instant. With the first way, the resulting passable area (in which the true position of the user can be located) will be greater than in the second way, however the integrity level obtained with the first way will be greater than that obtained with the second way. Either of the two strategies can be adopted depending on the needs and requirements of the specific application, but they are essentially equivalent insofar as the degree of uncertainty regarding the position of the user is essentially the same (a large area with a large probability or a smaller area with an also smaller probability).

The invention also provides the possibility of repeating steps 2) to 5) for each new position solution in each new instant, based on propagating the passable area from a previous instant which may or may not be the immediately previous instant, such that the new passable areas are determined along the trajectory of the user taking into account the previous ones for the purpose of progressively reducing the possible areas.

Similarly the periodic repetition of the process every so often towards previous instants is also possible, with a configurable periodicity and along an arc of configurable instants, recursively propagating the passable area in each instant to the previous instant by means of the position increase described in step 3) taken in the opposite direction, and determining the passable area according to the criterion previously set forth for the purpose of eliminating areas which were considered possible but can be ruled out with the present information.

The segment or road on which the user is circulating in a certain instant, as well as the trajectory followed over time, can thus be determined, maintaining the high confidence level given by the probability associated to the integrity in each instant.

The method can additionally incorporate the following aspects:

Direct estimation of the trajectory: in the case of GNSS positioning, in addition to processing the carrier phase measurements of the satellites, which allows calculating the position increase between two instants, it is also possible to optionally add the processing of Doppler measurements, from which the instantaneous velocity is obtained, incorporating a dynamic user model taking into account the restrictions in the users movement in terms of velocity and linear acceleration and possible maximum angles. Only the areas through which a passable path runs at all times are thus selected, it being possible to obtain a continuous, precise and integral trajectory on the map.

Road connectivity algorithms: topological restrictions can be taken into account in the propagation between instants, eliminating areas which, although passable, do not have a plausible path between both instants which the user has been able to travel, taking into account the restrictions in the dynamics thereof.

The method can use different criteria for selecting the instant from which the passable area ($t_a$) is propagated, such as storing the information of an instant with maximum observability and integrity ellipse with minimum size, or minimum passable integral area for example, for the purpose of reducing the passable areas of future instants, or simply propagating the area of the previous instant to the current one. It must be taken into account that the uncertainty in the increase of the phase measurement, and therefore of the position increase, increases over time, which will increase the area in the propagation.

Generating the passable areas in the map can be carried out beforehand, such that the method starts from an integral map of passable areas (provided by the GIS system), or it can be generated as the user travels along the map, successively converting areas thereof defined by segments and widths into passable areas ($S_a$). Likewise, the passable areas can be defined in several ways, such as polygons, cells or segments for example. The invention is independent from the shape in which the passable areas are determined.

Taking into account the integrity calculation using information of the previous instants, the method can incorporate a check in which the algorithm is restarted and only considers the information from the current instant when the integrity probability has diminished until being below the confidence threshold.

Extrapolating the method to three-dimensional (3D) environments by means of using the same concept for propagating integral areas and using integrity ellipsoids instead of ellipses and intersecting with passable volumes instead of surfaces.

BRIEF DESCRIPTION OF THE DRAWINGS

To complement the description being made and for the purpose of aiding to better understand the features of the invention according to a preferred practical embodiment thereof, a set of drawings is attached as an integral part of said description in which the following has been shown with an illustrative and non-limiting character.

DETAILED DESCRIPTION OF A PREFERRED EMBODIMENT OF THE INVENTION

A preferred implementation of the invention is described below based on a division of the map into cells. This implementation is illustrative and non-limiting, the invention being generic and its principles being able to be applied on other implementations based on geographic information expressed in other formats, such as segment sections representing roads and their associated width.

Figure 1:
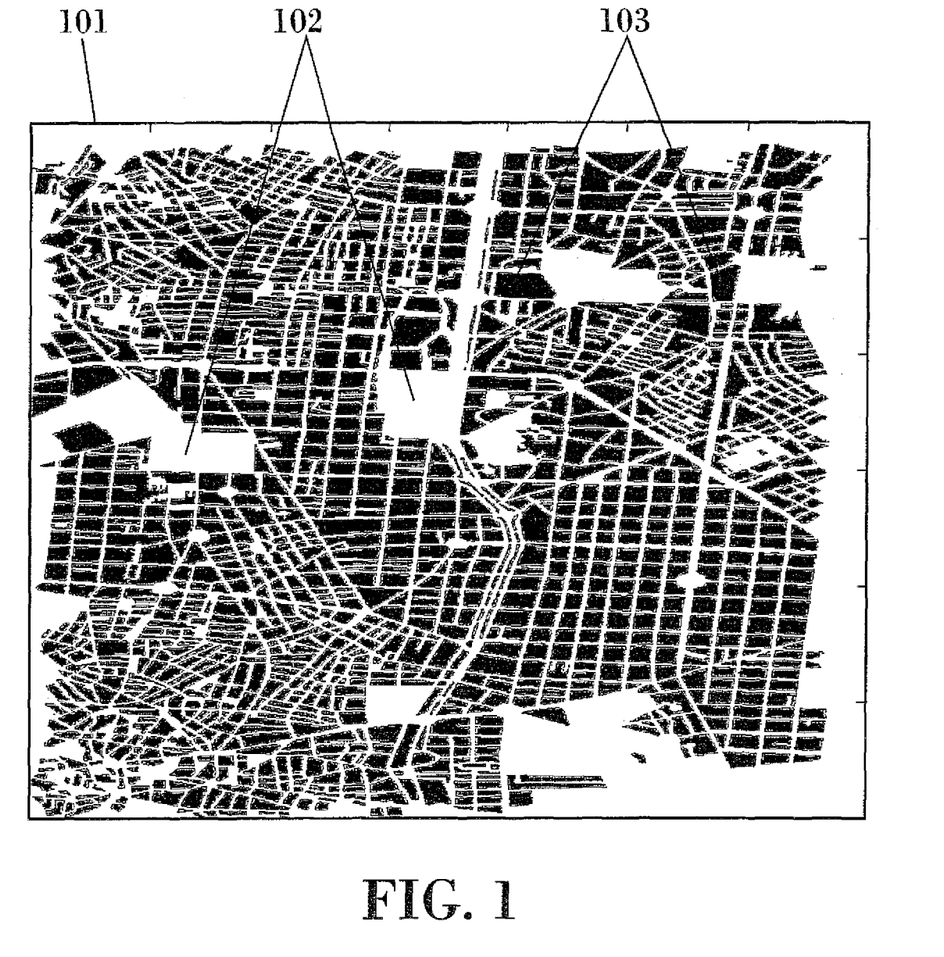
FIG. 1 shows a database example with passable areas (white) and non-passable areas (black) determined from a GIS database.

FIG. 1 shows an example of a map 101 in which the passable areas 102 are indicated in white and the non-passable areas 103 are indicated in black based on the information provided by a GIS database.

Figure 2A:
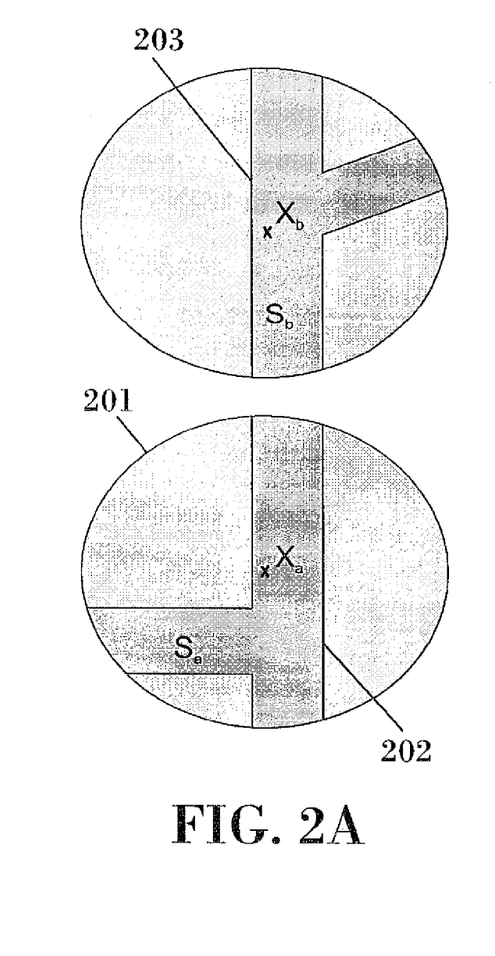
FIGS. 2A-2C graphically show an example of the process followed for determining the correct trajectory followed by a vehicle.

The method of the invention is explained below step by step based on FIGS. 2A, 2B and 2C explaining the process. Thus, starting from the GIS map in which the passable areas (for example, white areas 102 of the map 101, hereinafter TGIS) are defined in a given period or instant $t_a$:

1) The integral area of the user is determined in that instant, for example, from the estimated position $X_a$ and the integrity ellipse $I_a$ 201 associated to that position and instant of time, as shown in FIG. 2A.

2) The passable surface by the vehicle within the integral area or passable integral area $S_a$ in that instant $t_a$ 202 is determined as $S_a = I_a \cap TGIS$, where TGIS is the passable area defined from the GIS database.

Figure 2B:
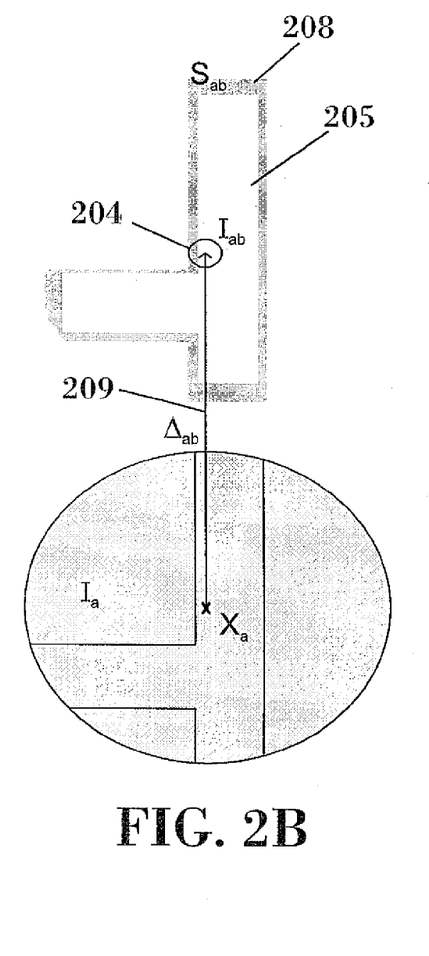
Figure 2C:
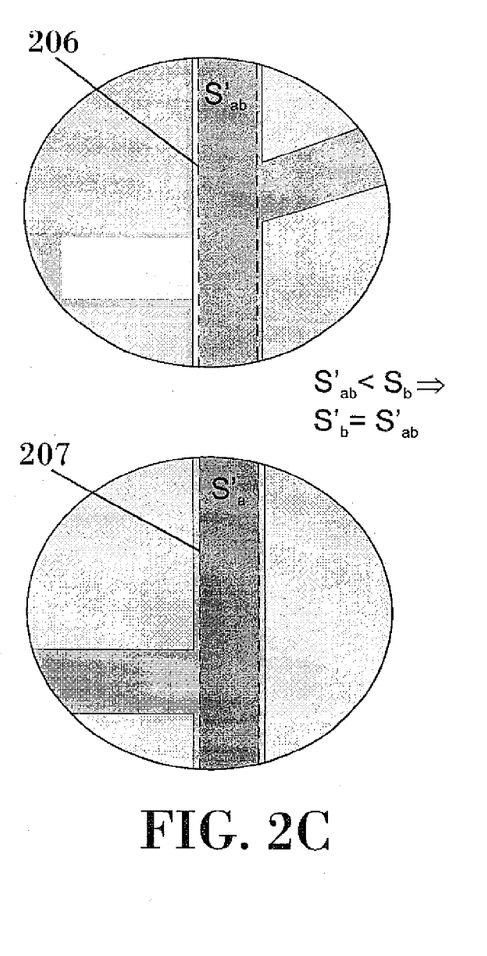

In a subsequent instant $t_b$:

3) The passable integral area $S_b$ is calculated in said instant $t_b$ 203 in the same way as in $t_a$ (in the particular case represented in FIGS. 2A-2C the integrity ellipse of the position in instant $t_b$ coincides in size with the integrity ellipse in instant $t_a$, but this does not necessarily have to be the case).

4) The user position increase $\Delta_{ab}$ between $t_a$ and $t_b$ is determined (FIG. 2B) by means of the increase in the carrier phase measurement of the satellites. The uncertainty associated to said increase, or integrity, is also estimated, giving rise to an integrity ellipse $I_{ab}$ 204, generally much smaller than that obtained for the absolute position. In the event that there are not enough measurements to determine the position increase with integrity with respect to a previous position, the algorithm is restarted.

5) A propagated surface is determined in that subsequent instant $t_b$ in the following manner:
   a. The surface $S_a$ is propagated with the position increase $\Delta_{ab}$ 209, the area 205 (indicated in the light shaded area in the upper part of FIG. 2B) being obtained.
   b. That obtained area 205 is increased with $I_{ab}$ such that the propagation is carried out maintaining the integrity, obtaining the propagated integral area $S_{ab}$ 208 (demarcated by the dark shaded area in the upper part of FIG. 2B). Said area corresponds to the integral area in $t_b$ from the information in $t_a$.
   c. The non-passable areas of $S_{ab}$ are eliminated, obtaining $S'_{ab}$ 206.

6) The new passable area $S'_b$ is obtained:
   a. Either as the smallest of $S'_{ab}$ and $S_b$.
   b. Or as the intersection of $S'_{ab}$ and $S_b$. In the depicted example (FIG. 2C), since $S'_{ab}$ is less than $S_b$, then $S'_b$ corresponds to $S'_{ab}$.

7) This process is carried out for each new position such that the passable area tends to be reduced to the road on which the user is located. In the event that there are no passable areas upon carrying out the intersection, an alarm is given off and the algorithm is restarted. In the event that $I_b$ could not be calculated, and therefore $S_b$ either, due to a lack of measurements, $S'_b$ will be determined as $S'_{ab}$. In the event that $\Delta_{ab}$ could not be calculated and therefore $S'_{ab}$ either, $S'_b$ will be determined as $S_b$.

8) Every so often the same processing is carried out in reverse, taking a certain arc of instants such that from the current information possible passable areas passed through are a posteriori reduced for the purpose of obtaining the integral area $S'_a$ in the period $t_a$ 207 (obtaining the correct trajectory from the beginning).

When the passable area is obtained according to option 6.a, and in the event that $S'_b$ is determined as $S'_{ab}$, it must be taken into account that the integrity level of $S'_{ab}$, i.e. the minimum guaranteed probability that the vehicle is located in this area, depends both on the integrity probability of $S_a$ and on the integrity probability of $\Delta_{ab}$, being equal to (or the lower limit being) the product of both:

$$P'_b = P'_{ab} \geq P_a * P_{ab}$$

wherein
$P'_b$ is the final probability that the user is located in $S'_b$
$P'_{ab}$ is the final probability that the user is located in $S'_{ab}$
$P_a$ is the probability that the vehicle is located in $S_a$ (or in $I_a$)
$P_{ab}$ is the probability that the estimation error of the relative position increase of the vehicle between $t_a$ and $t_b$ (i.e. the error made when calculating $\Delta_{ab}$) is limited by its corresponding integrity ellipse $I_{ab}$.

For example, if $P_a=0.99$ and $P_{ab}=0.99$ the final probability $P'_{ab}$ is:

$$P'_b = P'_{ab} \geq P_a * P_{ab} = 0.9801.$$

Generalizing the previous probability calculation to the case in which the area of a single period has been propagated and successively selected for N periods, its associated integrity probability is:

$$P'_{t+N} = P'_{t,t+N} = P_t \cdot \prod_{j=0}^{N-1} P_{t+j, t+j+1}$$

Furthermore, if the integrity levels of the positions of the different periods are always the same, say equal to a certain probability $P_x$, and the integrity levels of the position increases are also constant, say equal to a certain probability $P_\Delta$, the previous formula can be rewritten as:

$$P_{t+N} = P'_{t,t+N} = P_x \cdot (P_\Delta)^N$$

In the event that $S'_b$ is determined as $S_b$, the associated integrity probability $P'_b$ automatically corresponds to $P_b$:

$$P'_b = P_b$$

In case 6.b, i.e. when the implementation of the new passable area $S'_b$ is determined by means of the intersection of $S'_{ab}$ and $S_b$, the probability that the vehicle is located in the intersected area must be calculated. To that end a probability distribution in both areas is assumed, obtaining the final probability of the intersection or, more specifically, that the position of the user is located in the intersection of the areas, which will be at least the complementary of the sum of the probabilities that the position of the user is outside each of the two areas, $S'_{ab}$ and $S_b$. Therefore:

$$P'_b \geq P_a * P_{ab} + P_b - 1$$

The method is therefore able to provide a minimum measurable probability value (or minimum integrity level) associated to each period, based on theoretical fundamentals, using integrity information from previous periods.

Figure 3:
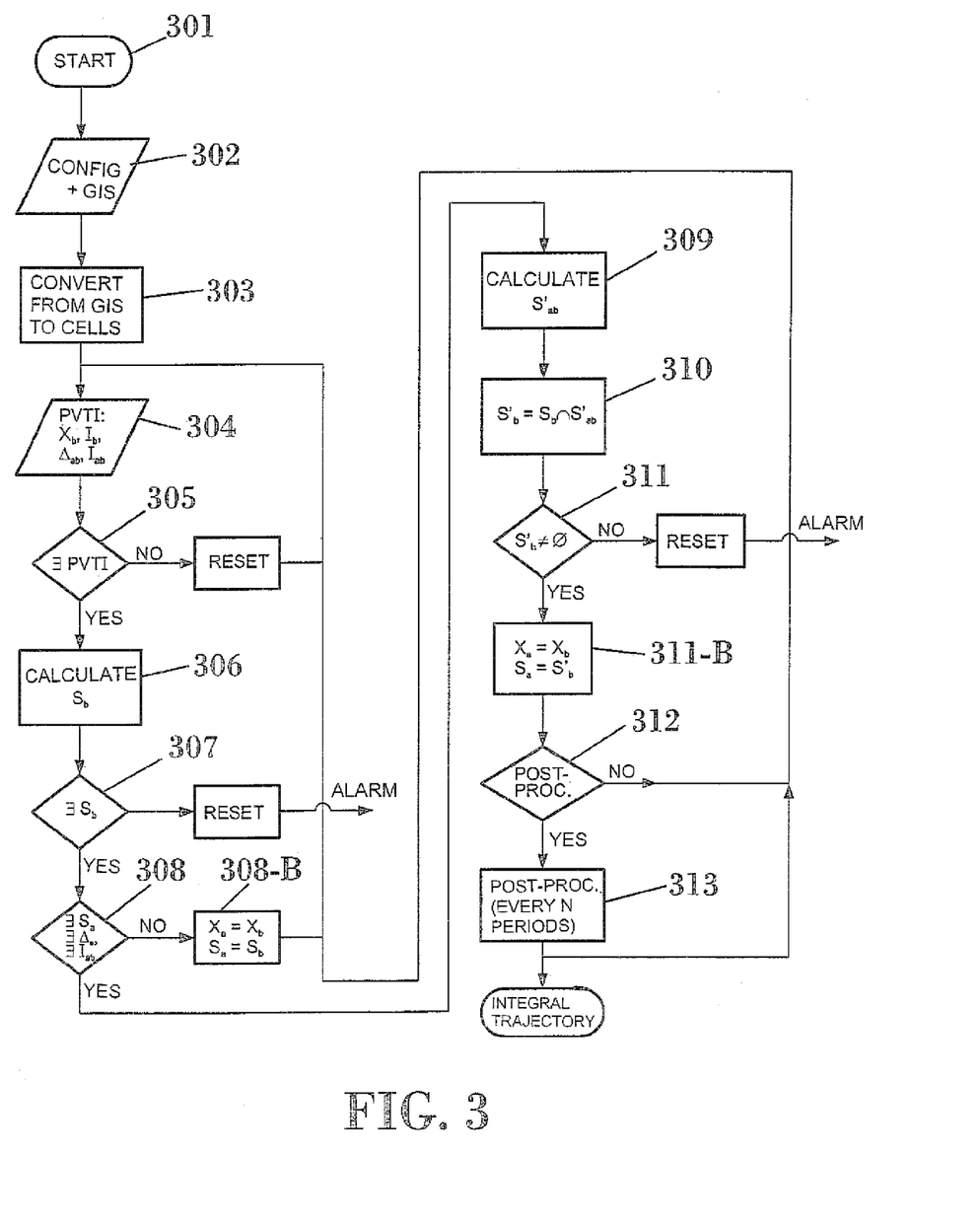
FIG. 3 shows the flowchart of the preferred implementation of the method.

FIG. 3 shows the flowchart of a preferred implementation of the invention, carried out by means of the following steps:

Starting 301, introducing the configuration and the GIS map: The GIS map with integral passable areas is divided into a grid of cells with a configurable dimension (for example, 1 meter×1 meter). It is conservatively determined if each cell is passable or non-passable depending on the GIS map; i.e. it is enough that a point of the cell is passable to declare it as such (steps 302 and 303).

For each period t, which will be called $t_b$ hereinafter to be consistent with the notation used in the rest of the text:
   a. The information on position $X_b$, position increase $\Delta_{ab}$ from a previous period $t_a$, position integrity ellipse $I_b$ and position increase integrity ellipse $I_{ab}$ are obtained (step 304). This set of information will be referred to hereinafter as PVTI solution.
   b. The existence of a PVTI solution is checked (step 305); in the event that it does not exist, the process is started again.
   c. The passable cells $S_b$ within the integral area are determined for period $t_b$ (step 306). In the event that part of one cell is located within the integral area and part is located outside, the cell will be considered complete in order to maintain the integrity. If no passable cell is obtained (step 307) the process is restarted and an alarm is generated.
   d. The existence of information $S_a$ of passable cells of the previous period $t_a$ as well as the relative trajectory $\Delta_{ab}$ between said period and the current period is checked with its corresponding associated uncertainty $I_{ab}$ (step

Figure 4:
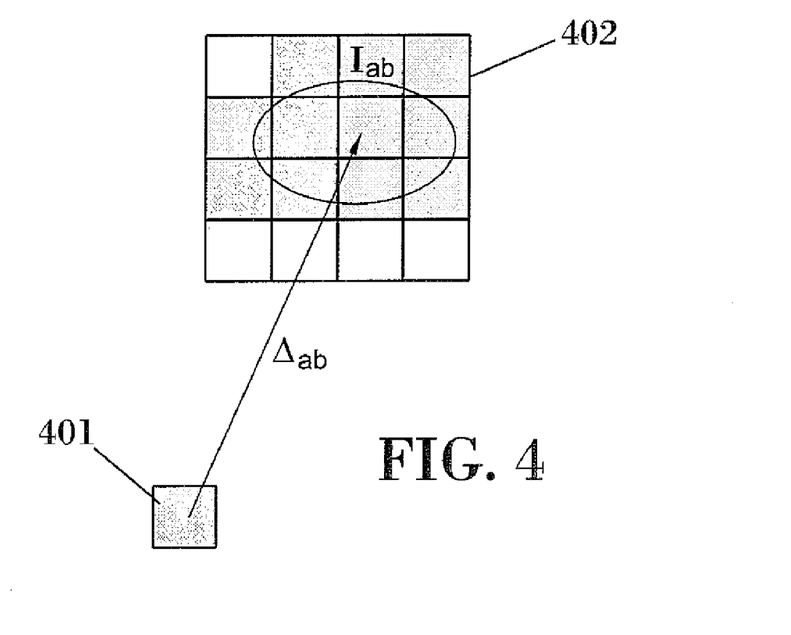
FIG. 4 shows an example of propagating from a passable cell to passable cells in a subsequent instant.

308). If any of these elements is not available, the position and integrity information is updated to begin to process the following period (step 308-B). In contrast, i.e. if all mentioned elements are available, the area $S_a$ is propagated according to the relative trajectory $\Delta_{ab}$ obtaining the propagated area $S'_{ab}$ (step 309):

i. Each cell of $S_a$ is propagated according to the relative trajectory $\Delta_{ab}$ ii. The adjacent cells corresponding to the uncertainty area associated to the propagation are joined with the propagated cell and measured by the integrity ellipse $I_{ab}$ of the position increase (as shown in FIG. 4 by means of the original cell 401 and the propagated cells 402)

iii. The non-passable cells are eliminated from the set of cells iv. The connectivity is optionally checked for each of the remaining cells, such that a cell is ruled out if there is no way that the vehicle could have passed from the initial cell to the propagated cell, given the temporal restrictions, the restrictions of the vehicle's velocity and the topological restrictions.

e. Once this process is carried out for all cells, the new passable integral area $S'_b$ is determined as the intersection of $S_b$ and $S'_{ab}$ (step 310). The existence of the solution is checked (step 311), in the event that it does not exist the process is started and an alarm is generated, and in the event that it does exist the position and the integrity information for the following period is updated (step 311-B).

It is checked if post-processing is to be carried out (step 312), and if it is, with a periodicity "n" (wherein "n" can be equal to 1, i.e. each time a PVTI solution is provided from GNSS information, typically one second), an arc with "m" periods is taken (wherein "m" can be from 1 to the entire time of the run), and the same processing is carried out in reverse over time (step 313), i.e. from the current period (t) to (t–m). Thus, areas which previously could not be ruled out will be eliminated.

FIG. 4 shows an example of how a passable cell 401 is propagated to the passable cells 402 in a subsequent period by means of the position increase $\Delta_{ab}$ and its associated uncertainty corresponding to the integrity ellipse $I_{ab}$ of the position increase.

Figure 5:
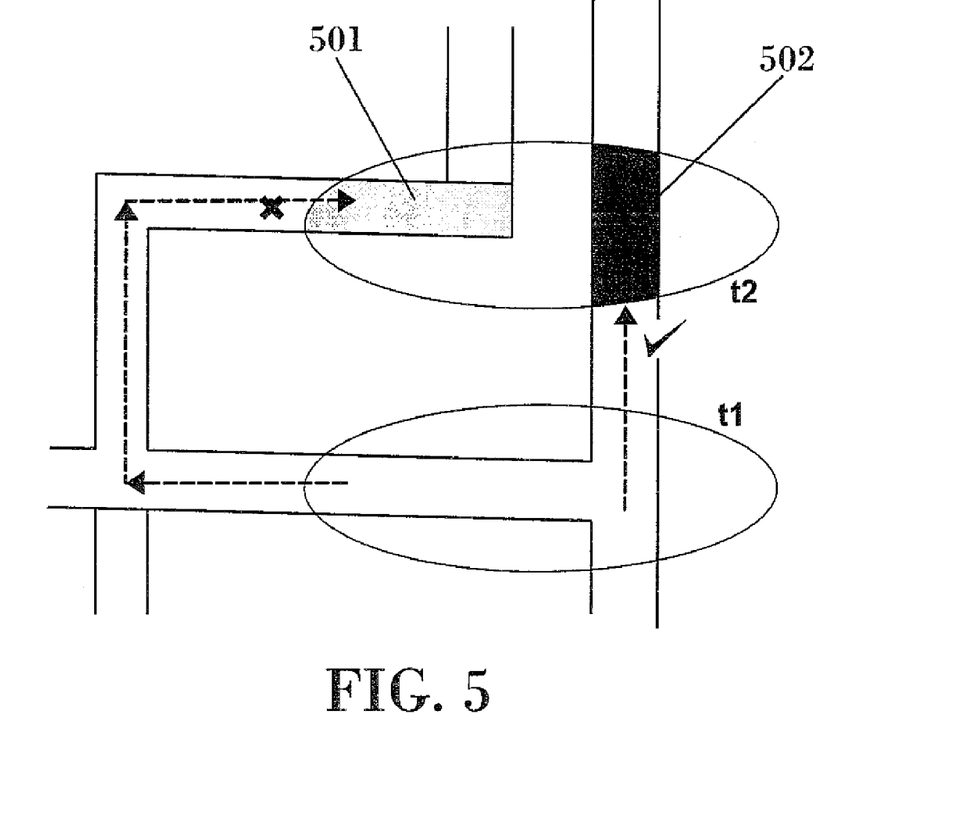
FIG. 5 shows an example for eliminating passable areas by connectivity, upon propagating the passable area from t1 to t2.

FIG. 5 shows an example of how certain passable areas will be eliminated or ruled out for connectivity reasons upon propagating the passable area between two periods t1 and t2.

Taking into account the restrictions in the dynamics of the vehicle and the topology of the streets, it is thus considered that the vehicle has not been able to travel the shortest path existing between the passable area in t1 and the propagated area in t2 corresponding to 501, therefore said area is ruled out. The area in t2 corresponding to 502 is considered valid since there is a path allowing the vehicle to have moved from the area in t1 to said area.

Figure 6:
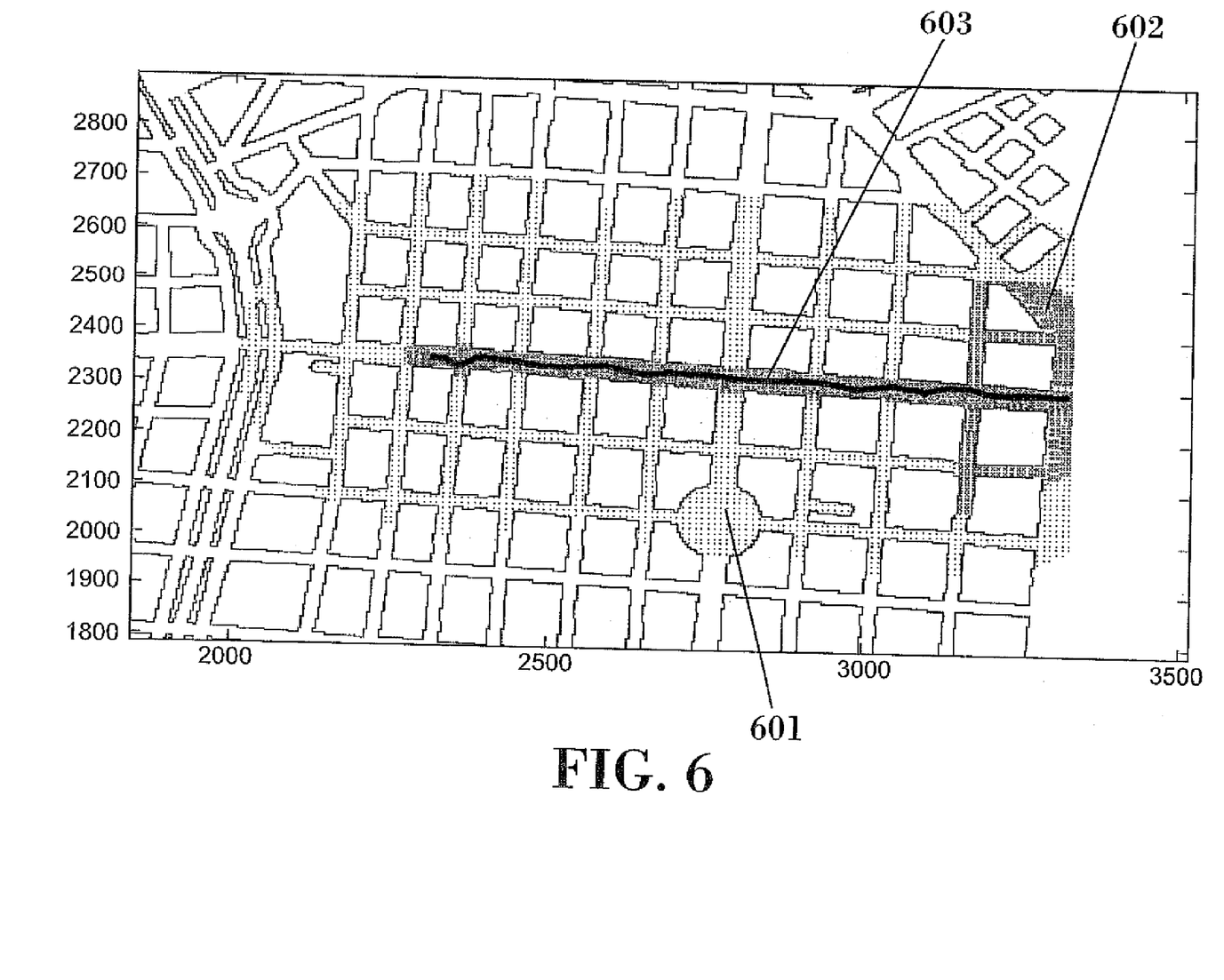
FIG. 6 shows a specific example for determining a trajectory by means of the invention.

FIG. 6 shows a specific example for determining a trajectory by means of the invention:

The area 601 shows the set of passable cells along the trajectory from the Protection Level of the position.

The area 602 shows the passable cells (marked with an "x") provided by the invention before post-processing. It can be observed that the initial uncertainty, covering several possible roads, is reduced as the trajectory is traveled.

The area 603 shows the integral passable cells after post-processing, together with the trajectory along the street (given without integrity).

The invention has been described according to a preferred embodiment thereof, but for a person skilled in the art it will be evident that other variations can be introduced without exceeding the object of the claimed invention.

The invention claimed is:

1. A method for determining a road or a set of passable roads or areas traveled by a user with a minimum associated probability or integrity which comprises:
receiving from a positioning system information relating to first and second position solutions of said user in a first instant of time $t_a$ and in a second instant $t_b$ after the first instant $t_a$, respectively, as well as respective position integrity ellipses, $I_a$ and $I_b$, with respective minimum associated probabilities, $P_a$ and $P_b$, that the user is located in each of them in $t_a$ and in $t_b$, respectively, and a position increase $\Delta_{ab}$ between $t_a$ and $t_b$ with its position increase integrity ellipse $I_{ab}$ and its associated probability $P_{ab}$;
obtaining from a geographic information system, information regarding respective passable areas corresponding to said first and second position solutions;
determining a first passable integral area $S_a$ and a second passable integral area $S_b$ as an intersection for each instant of time of said position integrity ellipses with said passable areas;
propagating said first passable integral area to the subsequent instant $t_b$ by means of the position increase $\Delta_{ab}$ between the first and second instants of time provided by the positioning system, taking into account the uncertainty associated to said increase determined by the position increase integrity ellipse $I_{ab}$, a propagated integral area $S_{ab}$ being obtained;
eliminating from said propagated integral area $S_{ab}$ the non-passable areas, a propagated passable integral area $S'_{ab}$ being obtained;
determining a final passable integral area $S'_b$ formed by a road or a set of passable roads in the second instant $t_b$, either as the smallest of said second passable integral area $S_b$ and said propagated passable integral area $S'_{ab}$ or as the intersection of said second passable integral area $S_b$ and of said propagated passable integral area $S'_{ab}$; and
determining the minimum probability $P'_b$ that the user is located in said final passable integral area $S'_b$ in the second instant $t_b$ or integrity level of $S'_b$ according to one of the following:
in the event that said final passable integral area $S'_b$ is said second passable integral area $S_b$, as the probability $P_b$ associated to the integrity ellipse $I_b$ of said second position solution, i.e. $P'_b = P_b$;
in the event that said final passable integral area $S'_b$ is said propagated passable integral area $S'_{ab}$, as the product of the probability $P_a$ associated to the first passable area $S_a$, given by the integrity ellipse $I_a$ of said first position solution, and the probability associated to the integrity ellipse $I_{ab}$ corresponding to the relative increase of position $\Delta_{ab}$ between $t_a$ and $t_b$, i.e. $P'_b = P_a \cdot P_{ab}$;
in the event that said final passable integral area $S'_b$ is determined as the intersection of the second passable integral area $S_b$ and said propagated passable integral area $S'_{ab}$, by means of the expression: $P'_b \geq P_a \cdot P_{ab} + P_b - 1$.

2. A method according to claim 1, which further comprises repeating the method defined in claim 1 for each position solution provided in each instant $t_i$, propagating the passable integral area from a previous instant $t_j$, determining passable roads or areas and their associated probability in several consecutive instants along a trajectory.

3. A method according to claim 1, which further carries out an additional processing or post-processing with a configurable periodicity and along a configurable arc of instants m, which comprises for each instant $t_i$ of said arc:

propagating the passable area of instant $t_i$, to the immediately previous instant $t_{i-1}$, by means of the position increase between both instants, taken in the opposite direction, and its associated integrity ellipse, and intersecting with the previously passable area calculated in $t_{i-1}$, and carrying out the previous steps on all instants of the arc, from $t_{i-1}$ to $t_{i-2}$, from $t_{i-2}$ to $t_{i-3}$, ..., up to $t_{i-m}$.

4. A method according to claim 1, wherein the positioning system is a GNSS system, in which the position increase between two instants of time and its integrity are determined by means of the increase of the carrier phase measurement of the satellites between both instants.

5. A method according to claim 4, wherein the positioning system used is a GNSS system hybridized with an inertial dead reckoning system.

6. A method according to claim 4, which further comprises providing a continuous trajectory traveled by the user based on Doppler measurements of the GNSS satellites, determining the instantaneous velocity of the user and the restrictions of the dynamics thereof.

7. A method according to claim 1, wherein the positioning system is a system based on beacons and/or wireless communications, and configured to provide said information relating to position solutions, to position increases between two instants of time and information relating to integrity associated to such position solutions and position increases.

8. A method according to claim 1, which further comprises carrying out a connectivity check upon propagating between instants and obtaining the propagated passable area, ruling out that passable area within said propagated passable area which could not have been accessed taking into account temporary and connectivity restrictions between areas.

9. A method according to claim 1, wherein if the probability that the user is located in the passable area has diminished over time and is below a preestablished threshold, the method is restarted and determines the passable area and its associated probability by only considering information relating to the current instant.

10. A method according to claim 1, providing a solution in three-dimensional environments using 3D maps and areas in space defined by integrity ellipsoid and its associated probability.

11. A method according to claim 1, wherein possible passable areas are propagated by means of dividing the passable area provided by the geographic information system GIS into passable and non-passable cells.

12. A method according to claim 1, wherein possible passable areas are propagated by means of dividing the passable area provided by the geographic information system GIS into polygons demarcating the passable areas.

13. A method according to claim 1, wherein possible passable areas are propagated by means of translating segments to which a certain width is assigned, and the distance of which to other segments is evaluated in order to determine intersections and passable areas.

* * * * *